United States Patent [19]

Bodlaj

[11] 4,201,475
[45] May 6, 1980

[54] DEVICE/PROCESS FOR CONTACT FREE DISTANCE AND THICKNESS MEASUREMENT

[75] Inventor: Viktor Bodlaj, Munich, Fed. Rep. of Germany

[73] Assignee: Siemens Aktiengesellschaft, Berlin & Munich, Fed. Rep. of Germany

[21] Appl. No.: 901,202

[22] Filed: Apr. 28, 1978

[30] Foreign Application Priority Data

May 18, 1977 [DE] Fed. Rep. of Germany ....... 2722577

[51] Int. Cl.$^2$ ............................ G01C 3/08; G01S 9/62
[52] U.S. Cl. ........................................ 356/381; 356/1; 356/4
[58] Field of Search ........................ 356/381, 382, 4, 1; 250/559, 560, 561

[56] References Cited

U.S. PATENT DOCUMENTS

| | | | |
|---|---|---|---|
| 3,923,395 | 12/1975 | Bodlaj | 356/4 |
| 4,053,234 | 10/1977 | McFarlane | 356/381 |
| 4,068,955 | 1/1978 | Bodlaj | 356/381 |
| 4,111,552 | 9/1978 | Bodlaj | 356/4 |

FOREIGN PATENT DOCUMENTS 2157813 5/1973 Fed. Rep. of Germany ........... 356/381
2508836 9/1976 Fed. Rep. of Germany ........... 356/381

OTHER PUBLICATIONS

Bodlaj, V., "Noncontact Measurement of Thickness and Distance by Laser Beam Deflection", Siemens Forsch.-u.Entwickl.-Ber., vol. 4, (1975), No. 6, pp. 336-344.
Bodlaj et al., "Remote Measurement of Distance and Thickness Using a Deflected Laser Beam", *Applied Optics*, vol. 15, No. 6, Jun. 1976, pp. 1432-1436.

*Primary Examiner*—F. L. Evans
*Assistant Examiner*—R. A. Rosenberger
*Attorney, Agent, or Firm*—Hill, Van Santen, Steadman, Chiara & Simpson

[57] ABSTRACT

A system is disclosed for non-contact distance or thickness measurements. A deflectable laser beam scans the object and produces a measuring impulse during a forward and reverse motion when the laser beam hits a point on an object along a sighting line of a measuring detector. A rectangular pulse is produced from each measuring pulse and rising or falling edges of the rectangular pulse are used for measurement. The impulse widths and possible store times of the evaluation circuitry do not influence the measuring result in the system disclosed.

9 Claims, 1 Drawing Figure

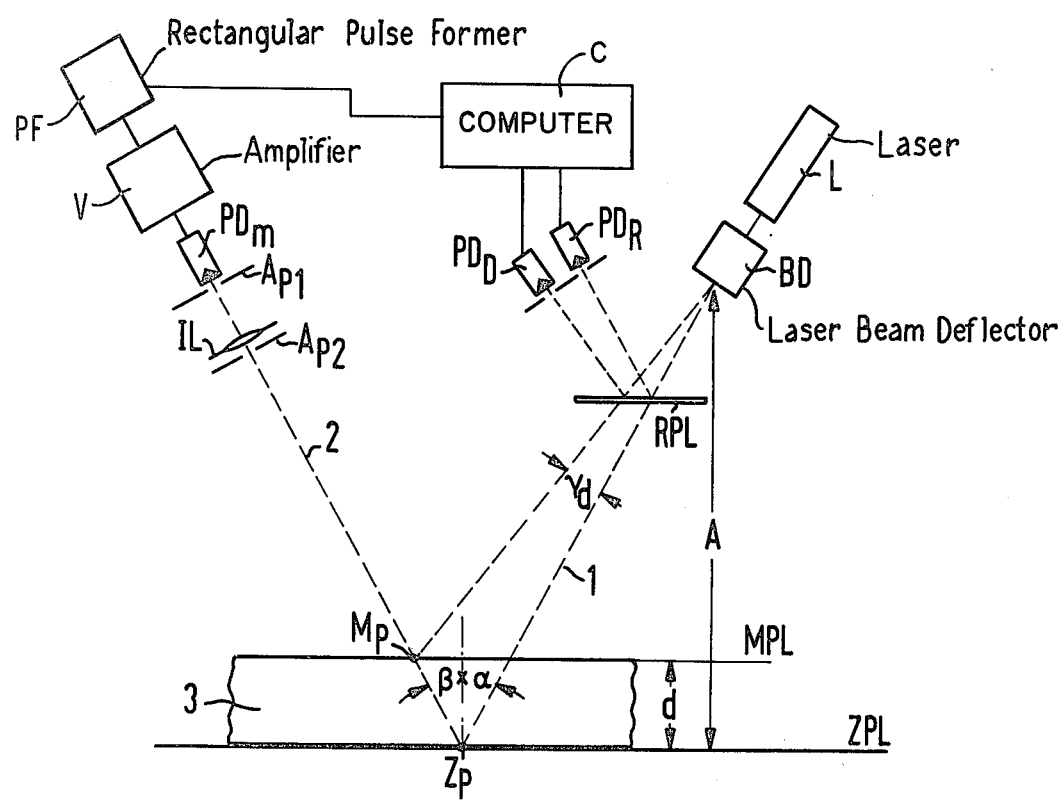

DEVICE/PROCESS FOR CONTACT FREE DISTANCE AND THICKNESS MEASUREMENT

BACKGROUND OF THE INVENTION

The invention relates to a contact-free determination of distances and thicknesses wherein the distance of a point on a surface of an object from a zero plane is measured by use of a sharply focused light beam which is periodically deflected by means of a beam deflector over a measuring area in which the object is arranged. A measuring photo detector is provided which is able to receive light only from a line of sight and with which it is possible to determine a measuring time at which the point located on the line of sight of the object's surface is hit by the light beam. The distance is determined from the time difference between the measuring time and the time at which the light beam is directed towards the point on the zero plane located on the light of sight.

Processes of this type are described, for example, in the German Offenlegungsschrift No. 2,157,813 and the German Offenlegungsschrift No. 2,546,714 and in the German Pat. No. 2,501,015 corresponding to U.S. Pat. No. 4,068,955.

A common feature of these processes and devices is that the thickness is determined by measuring the distances from the upper and lower sides of the object to be measured to a virtual zero plane. The number of distances between the upper and lower sides of the object to be measured to the virtual zero plane which must be established in order to determine the thickness is dependent upon the position of the object to be measured relative to the zero plane. For plane-parallel objects which lie or move in parallel with the zero plane, it is sufficient to measure a distance from the upper and lower sides of the object to be measured to the zero plane. The thickness of the object is then determined by subtracting the two distances. Determining the thickness of objects to be measured tilted relative to the zero plane is more complicated. In this case there is no linear relationship between the thickness and the measured distances.

SUMMARY OF THE INVENTION

An object of the invention is to further increase the measuring accuracy of a device of the above mentioned type.

This object is realized by a device, as described in the introduction, which, in accordance with the invention, converts pulses of the measuring photo-detector into rectangular pulses. These rectangular pulses are formed from a measuring pulse produced by the measuring photo-detector during a deflection movement in one direction and also from a measurement pulse produced during deflection movement in a reverse direction. From corresponding same side edges of the rectangular pulses the time difference corresponding to a distance may be computed.

BRIEF DESCRIPTION OF THE DRAWING

The drawing illustrates the measuring system of this invention for measuring the distance of a point on a surface object from a zero plane.

The drawing FIGURE illustrates a laser L and a laser beam deflector BD with which a mobile light beam 1 can be produced. A photo-detector, e.g. a photo-diode $PD_m$, is able to receive light only from one direction, which is effected with the aid of the slotted diaphragms $A_{P1}$ and $A_{P2}$ with a focussing optics IL. Only light beams along the line of sight 2 are recorded by the detector $PD_m$. The line of sight forms an angle $\beta$ with the vertical to the (virtual) zero plane ZPL. At the time $t_z$, the laser beam 1 is directed in such manner that it intersects the line of sight 2 at the point $Z_p$ on the zero plane ZPL. At this time the laser beam forms an angle $\alpha$ relative to the vertical to the zero plane. At this time, a sub-beam of the laser beam is projected from an adjustable reference plane RPL (consisting for example of an optically coated glass plate) onto a photo-detector $PD_R$, i.e. this detector emits a signal at the time $t_z$. At the time $t_m$, the line of sight and the laser beam intersect at the point $M_P$ on an object to be measured arranged at a distance d from the zero plane.

The measurement is based on the measurement of the time required by the periodically deflected laser beam during each deflection process in order to pass from the beginning point $Z_p$ on the zero plane ZPL to the measuring point $M_p$ on the object to be measured 3.

The light which is scattered in diffused fashion on the object to be measured, from the periodically deflected laser beam can only be received by the photo-diode $PD_m$ when it emanates from the point $M_p$. Only in this case do light beams which coincide with the line of sight form on the object 3 as a result of the diffused scattering. The measuring distance d between zero plane ZPL and measuring plane MPL which are parallel to one another is governed by $$d = A \frac{\sin\gamma_d}{\sin(\alpha + \beta + \gamma_d)} \cdot \frac{\cos\beta}{\cos\alpha} . \tag{1}$$

A is the distance between the laser beam deflector BD and the zero plane ZPL, and $\gamma_d$ is the angle of deflection of the laser beam from the zero point $Z_p$ to the measuring point $M_p$.

The measured distance d is generally not directly proportional to the angle of deflection $\gamma_d$. Only under the condition that the angles $\alpha + \beta = 90°$ and $\gamma_d < 5°$, is d proportional to the angle of deflection $\gamma_d$ $$d = A \cdot \gamma_d \tag{2}$$

where $\gamma_d$ is arc measurement. In this case the error is less than 0.2%.

Deflectors, whose angles of deflection are a linear function of the time can only be constructed at great expense for large angles of deflection and deflection frequencies of a few 100 Hz.

It is fundamentally simpler to construct beam deflectors with deflection frequencies of up to 1000 Hz and angles of deflection within a range of 10° if the time function for the angle of deflection is an angular function. A beam deflector of this type is described for example in the German Offenlegungsschrift No. 2,321,211. As in this beam deflector the angle of deflection $\gamma_d$ follows the sine law, in the deflection range which is of interest, for the measurement $\gamma_d$ is governed by:

$$\gamma_d = \gamma_{max}/2 \, (\sin \omega t_z - \sin \omega t_m) \tag{3}$$

where $\gamma_{max}$ is the maximum deflection amplitude (peak-peak of the deflection), $\omega$ is the angular speed of the beam deflection. The phase angle $\omega t_z$ can be selected to lie between 120° and 150°, and $\omega t_m$ can be selected to lie between $\omega t_z$ and 210° and 240°. The phase angle $\omega t_z$ and the time $t_z$ which is set with the photo-diode $PD_R$ and the reference plane RPL determines the point $Z_p$ on the zero plane (measuring distance d=0) within a deflection sweep. As a result of the introduction of the reference plane RPL, the laser beam no longer needs to contact the zero plane. Thus the material zero plane has been transformed into a virtual zero plane. $t_m$ is the time at which the laser beam reaches the measuring point $M_p$ within a deflection period (measuring distance d).

In the case of sinusoidal deflection, in accordance with equation (3) the distance d is governed by $$d = \frac{\sin[\frac{-\gamma max}{2}(\sin\omega t_z - \sin\omega t_m)]\cos\beta}{\sin[\alpha + \beta + \frac{\gamma max}{2}(\sin\omega t_z - \sin\omega t_m)]\cos\alpha} \quad (4)$$

The time difference $$\Delta t_d = t_m - t_z \quad (5)$$

is thus a gauge of the distance d.

Thus in this way it is possible to determine the distance d of a surface from the zero plane ZPL and the thickness of an object lying on the zero plane.

If the object does not lie on the zero plane and/or is inclined to the zero plane, it is necessary to determine a plurality of points on the upper side and lower underneath side of the object with respect to their distances from the zero plane. For this purpose the laser beam can be split, for example, into a plurality of sub-beams for the upper side and lower side by means of beam dividers. Then a detector corresponding to the detector $PD_m$ must be provided for each sub-beam. It is also possible to employ a plurality of devices of the type illustrated in the drawing figure, in which case each device determines the position of a different point on the upper side and lower side of the object. Then the object thickness can be determined from the position of the points.

As the distance and thickness measurement is based on the measurement of the length of time required by the deflected laser beam in order to pass from a point $Z_p$ on the zero plane to a measuring point $M_p$ on the object to be measured, both points lying on the line of sight, it is essential to precisely determine the measuring time in order to establish the degree of the measuring errors.

The measuring time is determined by two times $t_z$ and $t_m$ (equation 5). This time $t_z$ which determines the measuring time $\Delta t_d = 0$ and the zero plane is derived from the pulse $U_R$ which is formed in the photo-diode $PD_R$ when the laser beam passes through the point $R_p$ on the reference plane RPL. As the pulse is bell-shaped (Gauss distribution of the light density) and the amplitude is influenced only by the slight fluctuations in power of the laser (He-Ne laser), the time $t_z$ can be very accurately determined with the pulse if the pulse is differentiated and the zero transition of the differentiated signal is employed as time $t_z$.

It proves considerably more difficult to determine the measuring time $t_m$ in the case of the measuring signal since here the reception power is dependent upon the surface properties and can alter by up to 40 dB. These fluctuations in the reception power give rise to errors in the time determination with the differentiated signal. Further errors occur since the shape of the measuring pulse is dependent upon the depth of focus, focussing errors, modulation of an amplifier connected following the detector $PD_m$ (e.g. in the case of measurement on polished surfaces), and the shape of the stray light lobe of the measured surface. These influences upon the measuring time determination can be reduced if the measuring pulse is prepared as described in the following and the measuring time is determined therefrom.

The slotted diaphragm preceding the photo-diode $PD_m$ determines not only the direction of the line of sight of the focussing optics, but also the interval of time in which the image of the light spot of the deflected light beam hits the photo-diode.

In order to reduce the focussing errors of the focussing optics and to improve the focal depth, a second slotted diaphragm which is vertical to the plane of the beam deflection is placed in front of the lens on the optical axis in such manner that a symmetrical measuring signal is ensured in the entire measurement range.

The measuring pulse which is formed in the measuring photo-diode $PD_m$ is accordingly amplified in a wide-band amplifier and transformed into a rectangular pulse via a high-speed sensitive voltage comparator or rectangular pulse former PF. The rectangular pulse former PF may, for example, be a conventional Schmitt trigger which has a low threshold value or one which can be set low. Instead of a Schmitt trigger, it is also possible to use a monostable multivibrator if the trailing edge of the pulse produced by it always comes before the next measurement pulse. The duration of the rectangular pulse is dependent upon the setting of the threshold values of the voltage comparator and upon the amplitude of the measuring pulse. On account of the very high amplification of the high-speed comparator, the width of the rectangular pulse changes virtually symmetrically with the center of the measuring pulse when the measuring pulse amplitude has changed. If the times from the reference time $t_z$ (zero plane time $\Delta t_d = 0$) to the rising flank $t_c$ and from the reference time $t_z$ to the falling flank $t'_c$ of the rectangular pulse are added for various pulse widths, the sum of the two times remains constant even with a changed pulse width:

$$(t_c - t_z) + (t'_c - t_z) = \text{const.} \quad (16)$$

Thus the overall time remains independent of the measuring pulse amplitude. The measuring time $\Delta t_d$ is the time difference between the measuring signal center $t_m$ and the reference plane pulse $t_z$:

$$t_d = t_m - t_z = (t_c - t_z + t'_c - t_z)/2 \quad (17)$$

As the measuring pulses are amplified in the amplifier V prior to conversion into rectangular pulses in the voltage comparator or rectangular pulse former PF, even in the case of over-modulation (strong measuring signals) the amplifier does not have to possess any considerable storage times as otherwise additional measuring errors arise.

The measuring time can be determined substantially independently of the storage times if the rising flank of the measuring signal, for example, is always used for the time measurement. The time shift of the flank $t_c$ of the measuring pulse due to the amplitude fluctuations in the measuring pulse can be eliminated if the laser beam deflection in both directions (forwards and backwards) is used to measure the distance: during the deflection movement in the one direction, at the time $t_c$ a signal corresponding to the rising flank of the first measuring pulse produced by the photo-diode $PD_m$ is produced. During the deflection movement in the reverse direction, at the time $t_{cr}$ a signal is produced again corresponding to the rising flank of a second measuring pulse produced by the photo-diode $PD_m$. At the time $t'_z$ the laser beam again possesses the same direction as at the time $t_z$. Independently of the amplitude of the two pulses produced by the photo-diode, we have:

$$t_c - t_z + t'_z - t_{cr} = 2\Delta t_d \qquad (18)$$

where it has been assumed that the pulse which arises from the deflection in the one direction has the same amplitude as the following pulse during the deflection in the reverse direction. This is ensured since the object does not change its position or changes its position only insubstantially during a deflection period. The calculations set forth in equation 18 and the actual object distance calculations noted previously may be accomplished by well-known prior art computers C.

The measuring time $\Delta t_d$ is dependent not only upon the measured distance d but also upon the deflection speed of the laser beam deflected by a piezo-ceramic deflector. The deflection speed is determined by the nature of the deflection, the deflection frequency and the deflection amplitude. In order to achieve an exact measurement, it is either necessary to stabilize the deflection speed or to measure the deflection speed. In accordance with the drawing figure, this is effected with a photo-diode $PD_D$. Into this photo-detector, e.g. a photo-diode, there passes a sub-light beam at the time $t_D$, reflected from the reference plane RPL following the time $t_z$ during the deflection movement of the light beam. The time difference $t_D - t_z$ is a gauge of the deflection speed and can be used, for example, as a control signal to stabilize the deflection and the time difference and consequently the deflection speed are taken into account in calculating the distance d. Thus the distance can be determined from the measured time intervals, for example by means of a micro-computer.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A system for measuring the distance of a point on a surface of an object from a zero plane, comprising:
   a sharply focused light beam;
   beam deflector means for periodically deflecting the light beam in one direction and then a reverse direction over a measuring area in which the object is arranged, a point on the object being located on a predetermined line of sight during both directions of scan;
   a measuring photo-detector means for receiving light only along said predetermined line of sight and for providing a measuring pulse at a measuring time when the point on the object surface is hit by the light beam;
   means providing a reference pulse at a reference time when said beam deflector means deflects the light beam towards a zero plane point located on said predetermined line of sight;
   pulse former means for converting measuring pulses of the measuring photo-detector means into rectangular pulses;
   said measuring photo-detector means producing a first measuring pulse and said pulse former means producing a corresponding first rectangular pulse during deflection movement of the light beam by said deflector means in the one direction;
   said measuring photo-detector means producing a second measuring pulse and said pulse former means producing a corresponding second rectangular pulse during deflection movement of the light beam by said deflector means in the reverse direction; and
   means for determining a time difference representative of the distance from a comparison of corresponding same side edges of the first and second rectangular pulses with reference times produced during deflection of the light beam in the one and in the reverse directions.

2. A system as claimed in claim 1, characterized in that the light deflector means has a stabilized deflection speed.

3. A system as claimed in claim 1, characterized in that an additional photo-detector means is provided for receiving a sub-light beam gated thereto during deflection movement for measuring a deflection speed of the light deflector means.

4. A system as claimed in claim 1 wherein said pulse former has a low threshold value, fast switching speed characteristic.

5. A system as claimed in claim 4 wherein said pulse former means comprises a Schmitt trigger.

6. A system as claimed in claim 4 wherein said pulse former means comprises a monostable multivibrator.

7. A system as claimed in claim 1 wherein diaphragm means is employed with the measuring photo-detector means for ensuring reception of light only along the light of sight.

8. A method for measuring the distance of a point on a surface of an object from a zero plane comprising the steps of:
   providing a sharply focused light beam;
   periodically deflecting the light beam over a measuring area in which the object is arranged;
   receiving light only along a predetermined line of sight with a measuring photo-detector;
   during deflection of the light beam in one direction
      (i) determining a first reference time when said light beam strikes a reference plane point on said line of sight;
      (ii) producing a first measuring pulse at a first measuring time when an object surface point located on the line of sight is struck by the light beam;
   during deflection of the light beam in an opposite direction
      (i) producing a second measuring pulse at a second measuring time when said object surface point is again struck by the light beam;
      (ii) determining a second reference time when said light beam again strikes said reference plane point;
   converting the first and second measuring pulses to first and second rectangular pulses during deflection; and
   determining a time difference representative of distance from a comparison of the reference times with
   measuring times corresponding to same side edges of the first and second rectangular pulses.

9. The method of claim 8 in which the time difference $\Delta t_d$, the first measuring time $t_c$, the second measuring time $t_{cr}$, the first reference time $t_z$, and the second reference time $t'_z$ arerelated such that $\Delta t_d = t_c - t_z + t'_z - t_{cr}$.

* * * * *